United States Patent [19]

Schulte-Elte

[11] 3,923,898

[45] Dec. 2, 1975

[54] PROCESS FOR THE OXIDATION OF ALKYL-SUBSTITTUTED 2-CYCLOHEXEN-1-ONES

[75] Inventor: Karl-Heinrich Schulte-Elte, Geneva, Switzerland

[73] Assignee: Firemenich S.A., Geneva, Switzerland

[22] Filed: Nov. 8, 1973

[21] Appl. No.: 414,083

[30] Foreign Application Priority Data
Nov. 16, 1972 Switzerland.................... 16737/72

[52] U.S. Cl.............. 260/586 P; 131/17; 252/522; 260/586 R; 426/175; 426/193
[51] Int. Cl.²......................................... C07C 45/00
[58] Field of Search.......... 260/586 R, 586 B, 586 P

[56] References Cited
UNITED STATES PATENTS

| | | | |
|---|---|---|---|
| 2,819,298 | 1/1958 | Isler et al........................ | 260/586 R |
| 2,827,481 | 3/1958 | Isler et al........................ | 260/586 R |
| 3,380,456 | 8/1965 | Roberts et al................... | 260/586 R |
| 3,773,836 | 11/1973 | Hall................................ | 206/586 B |

OTHER PUBLICATIONS

Fiesex et al, "Reagents for Organic Synthesis", pp. 142–153 and 1059–1064, (1967),

*Primary Examiner*—Norman Morgenstern
*Attorney, Agent, or Firm*—Pennie & Edmonds

[57] ABSTRACT

Process for the preparation of diketone derivatives useful as perfuming and taste-modifying agents as well as intermediates for the preparation of compounds having utility in the pharmaceutical industry.

3 Claims, No Drawings

PROCESS FOR THE OXIDATION OF ALKYL-SUBSTITTUTED 2-CYCLOHEXEN-1-ONES

SUMMARY OF THE INVENTION

The present invention relates to a process for the preparation of diketone derivatives of formula

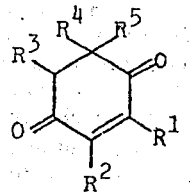

I wherein
a. one of the symbols $R^1$, $R^2$ and $R^3$ represents a lower alkyl radical and each of the two others represents a hydrogen atom, or
b. two of the symbols $R^1$, $R^2$ and $R^3$ represent each a lower alkyl radical and the other a hydrogen atom
and wherein each of the symbols $R^4$ and $R^5$ represents a lower alkyl radical.

In the definition of the above given formula, the term "lower alkyl radical" is here defined to mean a branched or a linear alkyl group containing from 1 to 6 carbon atoms, as e.g. a methyl, ethyl and propyl, isopropyl, n-butyl, isobutyl or tert-butyl.

The compounds prepared in accordance with the process of the present invention are useful starting materials or intermediates in the preparation of compounds having a utility in the pharmaceutical industry and moreover, due to their organoleptic properties, they find a useful industrial application as perfuming and as flavouring or taste-modifying agents.

BACKGROUND OF THE INVENTION

Since the first realization of the total synthesis of vitamin A, or that of β-carotene, several independent research groups took a great interest to the problem set by the synthesis of the specific compounds which could be used as starting materials or intermediates in the industrial preparation of certain carotenoids. To this effect certain chemical unities possessing an alicyclic skeleton comprising at least nine carbon atoms have been thoroughly studied. Namely, these compounds were prepared from 3,5,5-trimethyl-cyclohex-2-en-1-one, better known as isophorone, a commercial compound cheaply available on the market at practically unlimited quantities.

The above mentioned compounds comprising an alicyclic skeleton include namely 3,5,5-trimethyl-cyclohex-2-en-1,4-dione and certain of its homologues. These compounds are used as starting materials for the synthesis of certain carotenoids [cf. e.g. O. Isler "Carotenoids", Birkhauser Verlag, Basel (1971), p. 130], and are useful ingredients for the flavour and perfume industry [cf. e.g. U.S. Pat. No. 3,380,456].

Several synthetic routes have been suggested in the past for the preparation of derivatives such as those mentioned above. These include a method which uses isophorone as starting material as indicated by the hereinbelow reaction scheme.

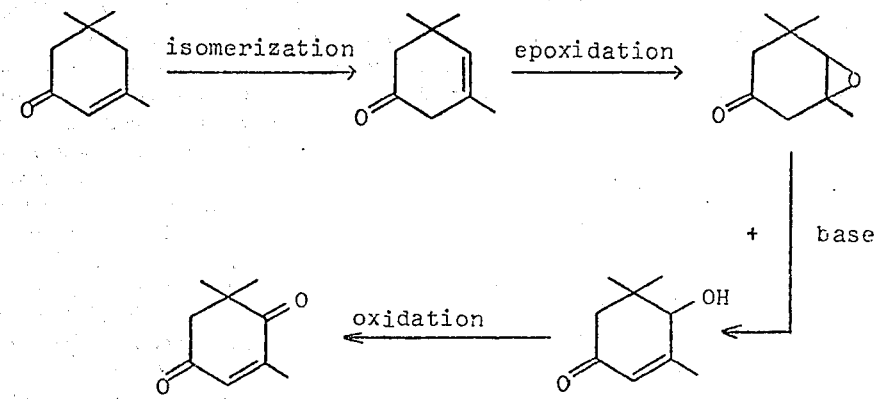

The said method has been namely described in Tetrahedron Suppl., 8, 1–7 (1966), Helv. Chim. Acta, 39, 2041 (1956) and in U.S. Pat. No. 2,917,539.

The above given synthesis however has the disadvantage of enabling the preparation of the desired diketone derivative with low yields, comprises several successive reaction steps and necessitates the use of relatively expensive reagents. As a consequence, it can be applied on industrial scale only with great difficulty.

We have studied several possibilities for achieving an industrially simpler and practical synthesis of 3,5,5-trimethyl-cyclohex-2-en-1,4-dione and certain of its homologues. Said compounds belong to the class of derivatives of formula I. In this respect, we have studied the oxidation of a bromo-derivative of isophorone, viz. 4-bromo-3,5,5-trimethyl-cyclohex-2-en-1-one, by means of nitropropane or of a tertiary amine oxide such as trimethylamine oxide.

However, said reaction did not lead to the desired product but it afforded instead 2,4,4-trimethyl-cyclohex-5-en-6-ol-1-one, a compound of formula

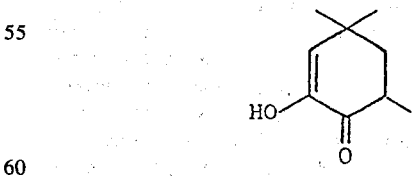

[cf. German patent application No. 2,202,066, laid open to public inspection on Aug. 10, 1972].

It is known that the direct oxidation of a methylene group in the allylic position to afford the corresponding carbonyl derivative, can be effected according to a method which comprises an irradiation of a methylenic compound in an aqueous medium in the presence of N-bromosuccinimide /cf. e.g. Chem. Comm., 1969, 1220/. However, when applied to isophorone, this method proved itself to be unsuccessful. Other known conventional oxidation procedures were equally found unsatisfactory. These include the processes described in J. Am. Chem. Soc., 79, 6308 (1957), J. Am. Chem. Soc. 83, 2952 (1961), J. Org. Chem. 33, 3566 (1968), Tetrahedron Letters 1972, 1823 and Liebigs Ann. Chem. 627, 237 (1959), all of them either did not enable the preparation of appreciable amount of the desired end product, or simply the yields achieved were too poor for any practical consideration.

PREFERRED EMBODIMENTS OF THE INVENTION

We have surprisingly found that the compounds of formula I can be prepared in good yields by direct oxidation of the ketone compounds of formula

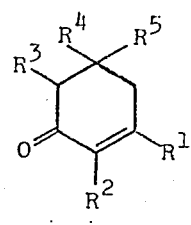

II or

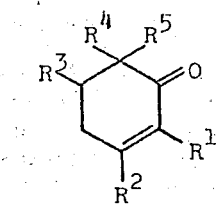

III wherein the symbols $R^1$, $R^2$, $R^3$, $R^4$ and $R^5$ are defined as indicated for formula I.

An object of the present invention is therefore to provide a process for the preparation of compounds of formula I, which process comprises a direct oxidation of a compound of formula II or III, by means of an oxygen containing transition metal derivative using at least three equivalents of oxidation agent for one equivalent of starting material.

As transition metal, chromium is preferred. Typically, the best yields of end products were achieved by using an alkali metal chromate or bichromate such as e.g. sodium or potassium chromate or bichromate, or an oxide such as chromium trioxide. Said oxidation can be effected by reacting the starting material with the chosen oxidation agent in a homogeneous or heterogeneous phase obtained by admixture of the starting material with a suspension of the oxidation agent in an organic or aqueous organic solvent. Preferentially, there is used chromium trioxide in suspension in tert-butanol or in a mixture of water-benzene in the presence of sulfuric acid. $Na_2Cr_2O_7$ in acetone in the presence of sulfuric acid can be equally used.

We have found that the best yields of the final product were achieved by carrying out the reaction in a mixture comprising acetic acid and acetic anhydride. Said mixture preferencially contains one part by weight of acetic acid and one to two parts by weight of acetic anhydride.

The reaction medium can additionally comprise one or more supplemental solvents, such as benzene, toluene, chlorinated hydrocarbons, e.g. chloroform and methylene chloride, ethers, e.g. diethyl ether, dioxane, tetrahydrofurane or monoglyme, or hydrocarbons, e.g. n-pentane, n-hexane or cyclohexane.

The reaction temperature can vary within a wide range. We have however noticed that beyond a certain upper limit, the reaction could not take place anymore under control conditions. This upper limit can vary and namely it depends on the respective amounts of acetic acid and acetic anhydride present in the reaction medium. Thus, when mixtures containing quantities ratios comprised between about 1:1 and 1:2 are used, said temperature limit is of about 50°C. However, the reaction can be conveniently effected at temperatures beyond this limit, namely when the reaction medium contains mixtures whose content of acetic acid is higher than that indicated hereinabove. Equally, we have found that the lower temperature limit is of about 5°C.

The time of reaction can equally vary in a broad range: typically, it is comprised between about 6 and 72 hours. For instance, we have found that whenever $Na_2Cr_2O_7$ is used as oxidation agent, 48 hours were necessary for achieving a complete conversion of the starting material.

It is to be understood that the time limits given above do not represent absolute values, in certain cases in fact shorter or longer reaction times than those indicated may be sufficient or required.

According to a preferred embodiment of the present invention, the amount of oxidation agent used is comprised between about 3 and about 6 equivalents, more preferencially between about 4 and 4.5 equivalents, of oxidation agents for one equivalent of starting material.

According to a further preferred embodiment of the process of the invention, the direct oxidation of the compounds of formula II and III is carried out at a temperature ranging from about 20° to 30°C, by means of an oxygenated derivative of chromium maintained in solution or suspension in a mixture of acetic acid and acetic anhydride.

Due to their sensibly higher boiling points, the by-products formed in the course of the reaction can be conveniently separated from the desired end product by means of the usual techniques such as fractionation and distillation.

The compounds which can be prepared in accordance with the process of the present invention include the following new compounds,
2,2,5-trimethyl-cyclohex-5-en-1,4-dione, and
2,2,5,6-tetramethyl-cyclohex-5-en-1,4-dione.

We have found that said compounds as well as 2,2,5-trimethyl-cyclohexa-1,4-dione, a new compound obtained by reducing the corresponding unsaturated derivative, possessed interesting organoleptic properties and as a consequence can be conveniently used as perfuming and flavouring agents on their own or preferencially in combination with other ingredients, carriers or diluents.

A further object of the present invention is to provide a method for modifying the perfuming properties of perfumes and perfumed products, which method comprises adding thereto an effective amount of at least one of the compounds mentioned above.

A still further object of the present invention is to provide a method for modifying the organoleptic properties of foodstuffs, feedstuffs, beverages, pharmaceutical preparations and tobacco products, which method comprises adding thereto a small but flavouring effective amount of at least one of the compounds mentioned above.

The compounds of formula II, used as starting materials in the process of the invention, are commercially available or may be synthetized according to one of the known processes of the art, viz. described in J. Chem. Soc., 1959, 2186 and J. Chem. Soc., 1956, 2179.

The compounds of formula III can be prepared according to known methods, e.g. according to the process described in Helv. Chim. Acta, 39, 259 (1956). Alternatively, they may be synthetized by condensing isopropyl-methyl ketone with an α,β-unsaturated ketone in accordance with the hereinbelow given scheme:

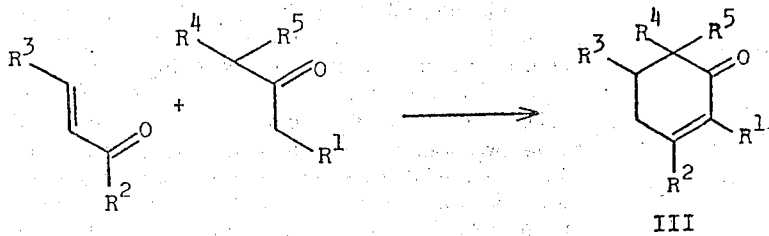

[cf. Tetrahedron Letters, 1971, 4995]. In the hereinabove given formulae, symbols $R^1$, $R^2$, $R^3$, $R^4$ and $R^5$ are defined as above indicated.

The invention is better illustrated by the following examples wherein the temperatures are indicated in degrees centigrade and the abbreviations have the meaning usual in the art.

EXAMPLE 1

3,5,5-Trimethyl-cyclohex-2-en-1,4-dione

A. oxydation of isophorone by means of $Na_2Cr_2O_7.2H_2O$:

80 ml of acetic anhydride were added dropwise to a mixture kept at ca. 10°–15° of 135 g (0.45 mole) of $Na_2Cr_2O_7.2H_2O$ and 80 ml of acetic acid. The mixture was maintained under stirring for two hours, whereupon 13.8 g (0.10 mole) of isophorone (purity ca. 95%) were added thereto and the obtained mixture was kept under stirring overnight. 100 ml of acetic anhydride have then been added to the reaction mixture, the temperature of which gradually increased from 25° to ca. 35°.

The reaction progress was checked by means of vapour phase chromatography. The starting material was fully converted within 48 hours.

The reaction mixture was then poured onto crushed ice, extracted with ether and the organic extracts were successively washed with a $NaHCO_3$ aqueous solution, and with water, and finally dried over $MgSO_4$ and concentrated under reduced pressure. The thus obtained residue was fractional distilled to yield 7.6 g (yield = ca. 50%) of 3,5,5-trimethyl-cyclohex-2-en-1,4-dione.

By further purification by means of a fractional distillation on a Vigreux column, there was isolated a pure compound which rapidly crystallized upon cooling in a ice bath. The physical constants of the obtained product were identical with those of a pure sample prepared in accordance with the procedure described in Helv. Chim. Acta, 39, 2041 (1956). B.p. 95°–96°/12 Torr; $n_D^{20} = 1.4880$ B. oxydation of isophorone by means of $CrO_3$:

40 g of $CrO_3$ (40 mole) were slowly added to a mixture maintained at 10° under stirring of 13.8 g (0.10 mole) of isophorone (purity ca. 95%), 100 ml of acetic anhydride and 100 ml of acetic acid. The reaction mixture was then vigorously stirred until complete conversion of the starting material. The reaction took place within 24 to 30 hours, as indicated by a reaction progress control as described in paragraph A above.

By following the above described treatments of extraction and purification, there were obtained 7 g (yield = ca. 46%) of 3,5,5-trimethyl-cyclohex-2-en-1,4-dione.

C. oxydation of isophorone by means of $Na_2CrO_4$:

13.8 g (0.10 mole) of isophorone (purity ca. 95%) in 80 ml of acetic anhydride were added dropwise to a mixture maintained at 5°–10° of 80 ml of acetic acid and 64.8 g (0.40 mole) of $Na_2CrO_4$. The reaction mixture was then kept under stirring at the afore mentioned temperature during 10 hours, whereupon 100 ml of acetic anhydride were added thereto.

By following the above described treatments (see letter A above) there were isolated 7.5 g. (yield ca. 50%) of 3,5,5-trimethyl-cyclohex-2-en-1,4-dione.

D. oxidation of 2,2,6-trimethyl-cyclohex-5-en-1-one:

80 ml of acetic anhydride were slowly added to a mixture kept at 10°–15° under nitrogen atmosphere of $Na_2Cr_2O_7.2H_2O$ in 80 ml of acetic acid. To the obtained reaction mixture, there were added 13.8 g (0.10 mole) of 2,2,6-trimethyl-cyclohex-5-en-1-one, and the whole was stirred at ca. 25° overnight. 36 hours were necessary for the complete conversion of the starting material as indicated by the usual control by vapour phase chromatography.

By following the same treatment as described under letter A above, there were collected 10.2 g of a yellow oil which afforded by vapour phase chromatographic separation ca. 7.0 g (yield = ca. 46%) of 3,5,5-trimethyl-cyclohex-2-en-1,4-dione and ca. 3.0 g of 2,2,6-trimethyl-5,6-epoxy-cyclohexanone.

The analytical data of this latter compound were the following:

$n_D^{20} = 1.4560$; $d_4^{20} = 1.007$
IR : 1710 cm$^{-1}$
NMR : 0.96 and 1.08 (6H, 2s); 1.32 (3H, s); 3.24 (1H, m) δ ppm
MS : $M^+ = 154$ (28); m/e : 139 (0.1); 126 (2); 111 (47); 97 (22); 83 (18); 71 (89); 56 (92); 43 (100); 27 (33).

2,2,6-trimethyl-cyclohex-5-en-1-one used as starting material for the hereinabove process can be prepared in accordance with the method described in J. Am. Chem. Soc., 77, 5991 (1955).

EXAMPLE 2

2,2,5-Trimethyl-cyclohex-5-en-1,4-dione 13.8 g (0.10 mole) of 2,2,5-trimethyl-cyclohex-5-en-1-one (purity ca. 96%) were added dropwise under stirring to a mixture kept at approximately 10° of 135 g (0.45 mole) of $Na_2Cr_2O_7 \cdot 2H_2O$, 80 ml of acetic anhydride and 80 ml of acetic acid. After having been left at 25° during 10 hours, there were added 100 ml of acetic anhydride. The starting material was fully converted within 36 hours (see the procedure followed and described in Example 1).

By the usual treatments of neutralisation, washing, drying and evaporation in much the same way as above described in Example 1, there were isolated 13 g of a yellow oil containing approximately 70% of 2,2,5-trimethyl-cyclohex-5-en-1,4-dione as revealed by an analysis by means of vapour phase chromatography. The obtained compound showed the following analytical data: m.p. 83°–84°

IR : 1680 and 1620 $cm^{-1}$

NMR : 1.2 (6H, 2s); 1.97 (3H, d, J=2 cps); 2.64 (2H, s) δ ppm

MS : $M^+$ = 152 (39); m/e : 137 (4); 124 (1); 109 (5); 96 (90); 81 (3); 68 (100); 55 (4); 55 (4); 39 (45); 27 (8).

By reducing the above prepared compound by means of zinc powder in acetic acid, the corresponding saturated derivative, 2,2,5-trimethyl-cyclohexa-1,4-dione, was obtained. This latter derivative is a new compound.

IR : 1710 $cm^{-1}$

NMR : 1.12 (3H, d, J=7 cps); 1.12 (6H, 2s); 2.5 (2H, s); 2.62 (2H, m); 2.6 (1H, m) δ ppm MS : $M^+$ = 154 (33); m/e : 139 (66); 125 (1); 111 (4); 97 (1); 83 (22); 69 (57); 56 (80); 42 (100); 27 (22).

2,2,5-Trimethyl-cyclohex-5-en-1-one, used as starting material for the hereinabove preparation, can be prepared from methyl-vinyl ketone and methyl-isopropyl ketone according to the method described in Tetrahedron Letters, 1971, 4995. The compound showed the following characteristics:

B.p. 86°–87°/12 Torr; $n_D^{20}$ = 1.4788; $d_4^{20}$ = 0.9405

EXAMPLE 3

2,2,5,6-Tetramethyl-cyclohex-5-en-1,4-dione 11.0 g (ca. 0.07 mole) of 2,2,5,6-tetramethyl-cyclohex-5-en-1-one were added dropwise to a mixture cooled to ca. 50° of 108 g (0.40 mole) of $Na_2Cr_2O_7 \cdot 2H_2O$, 150 ml of acetic acid and 150 ml of acetic anhydride. Once the addition was over, the mixture was kept under stirring at 25° overnight, then poured onto crushed ice and extracted with petrol ether (b.p. 40°–60°). The organic phase was neutralised, washed, dried and finally concentrated according to the same procedure as that described in Example 1. The obtained residue (ca. 10 g) afforded 7.0 g (ca. 42%) of 2,2,5,6-tetramethyl-cyclohex-5-en-1,4-dione, whose analytical data are as follows:

$n_D^{20}$ = 1.4899; $d_4^{20}$ = 1.016

IR : 1680 and 1620 $cm^{-1}$

NMR : 1.2 (6H, 2s); 1.95 (6H, 2s); 2.62 (2H, s) δ ppm

MS : $M^+$ = 166 (45); m/e : 151 (55); 110 (40); 95 (10); 82 (55); 54 (100).

2,2,5,6-Tetramethyl-cyclohex-5-en-1-one used as starting material for the hereinabove described process, can be prepared from methyl-vinyl ketone and ethyl-isopropyl ketone in accordance with the process described in Tetrahedron Letters 1971, 4995.

$n_D^{20}$ = 1.4849; $d_4^{20}$ = 0.9311

IR : 1665 and 1640 $cm^{-1}$

NMR : 1.03 (6H, 2s); 1.68 (3H, m); 1.86 (3H, m) δ ppm

MS : $M^+$ = 152 (18); m/e = 109 (1); 96 (100); 68 (25); 67 (20); 53 (10); 41 (15).

The following examples illustrate in an unrestrictive manner the use of the compounds of the invention as flavouring ingredients.

EXAMPLE 4

Aromatization of black tea

The aromatization of a commercial sample of black tea possessing a bland taste has been carried out as follows:

To one liter of tea infusion there were added 2 ml of a 1% ethanolic solution (95% ethyl alcohol) of 2,2,5-trimethyl-cyclohex-5-en-1,4-dione ("test" sample). A "control" sample was prepared by adding to an identical quantity of tea infusion 2 ml of 95% ethyl alcohol.

The two beverages thus obtained were then subjected to the organoleptic evaluation by a panel of experts. These declared that the "test" sample possessed a more harmonious aroma than that of the "control" sample and presented a note typical of dry leaves, said note being more pronounced than that showed by the "test" sample.

By replacing 2,2,5-trimethyl-cyclohex-5-en-1,4-dione by the corresponding saturated diketone or by 2,2,5,6-tetramethyl-cyclohex-5-en-1,4-dione, analogous effects were observed.

EXAMPLE 5

10 g of a 1% ethanolic solution (95% ethyl alcohol) of 2,2,5-trimethyl-cyclohex-5-en-1,4-dione were sprayed onto 100 g of a mixture of tobacco of American blend type. The tobacco thus flavoured was then used for the manufacture of test cigarettes, the smoke of which was subjected to an evaluation by comparison with the smoke of control cigarettes. These latters were prepared with a tobacco which was previously treated with a proportional amount of 95% ethyl alcohol (10 g ethyl alcohol for 100 g of tobacco).

The panel of experts declared that the smoke of the test cigarettes possessed a more rounded aroma than that of the control cigarettes. The taste of the test cigarettes possessed moreover a slight character typical of dry leaves.

By replacing 2,2,5-trimethyl-cyclohex-5-en-1,4-dione by the corresponding saturated diketone or by 2,2,5,6-tetramethyl-cyclohex-5-en-1,4-dione, analogous effects were observed.

I claim:

1. A process for the preparation of a diketone compound of the formula

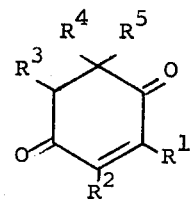

I wherein (a) one of the symbols $R^1$, $R^2$, and $R^3$ represents a lower alkyl radical and each of the two others represents a hydrogen atom, or (b) two of the symbols $R^1$, $R^2$ and $R^3$ represent each a lower alkyl radical and the other a hydrogen atom and wherein each of the symbols $R^4$ and $R^5$ represents a lower alkyl radical, which comprises contacting a ketone compound of the formula:

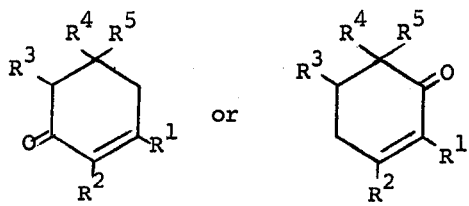

wherein $R^1$, $R^2$, $R^3$, $R^4$ and $R^5$ are the same as defined in Formula I above with at least three equivalents, per equivalent of ketone, of an oxidation agent selected from alkali metal chromate, alkali metal bichromate and chromium trioxide and a mixture of acetic acid and acetic anhydride to directly oxidize the ketone to the diketone; said contacting being carried out at a temperature of between about 5° and 50°C.

2. The process according to claim 1 wherein the oxidizing agent is selected from sodium chromate or potassium dichromate used in from about three to about 6 equivalents per equivalent of ketone.

3. The process according to claim 1 wherein the ketone compound and the oxidizing agent are contacted at a temperature comprised at between about 20° and 30°C and the mixture contains one part by weight of acetic acid for about 1 to 2 parts by weight of acetic anhydride.

* * * * *

UNITED STATES PATENT AND TRADEMARK OFFICE
CERTIFICATE OF CORRECTION

PATENT NO. : 3,923,898
DATED : December 2, 1975
INVENTOR(S) : Karl-Heinrich Schulte-Elte It is certified that error appears in the above-identified patent and that said Letters Patent are hereby corrected as shown below:

Column 8, line 49, "test cigarettes" should be

--"test" cigarettes--.

Column 8, lines 50, "control cigarettes" should be

--"control" cigarettes--.

Column 8, line 50, "test cigarettes" should be

--"test" cigarettes--.

On page 1 of the Deed, assignee "Firemenich" should be

--Firmenich--.

Signed and Sealed this

*thirtieth* Day of *March 1976*

[SEAL]

Attest:

RUTH C. MASON
*Attesting Officer*

C. MARSHALL DANN
*Commissioner of Patents and Trademarks*